(12) United States Patent
Winter et al.

(10) Patent No.: US 9,791,566 B2
(45) Date of Patent: Oct. 17, 2017

(54) DEVICE FOR THE OPTICAL MEASUREMENT OF THE DISTANCE FROM A REFLECTING OR SCATTERING TARGET OBJECT

(71) Applicant: Hilti Aktiengesellschaft, Schaan (LI)

(72) Inventors: Andreas Winter, Feldkirch (AT); Torsten Gogolla, Schaan (LI); Petra Eyrich, Rebstein (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 14/779,880

(22) PCT Filed: Mar. 25, 2014

(86) PCT No.: PCT/EP2014/055949
§ 371 (c)(1),
(2) Date: Sep. 24, 2015

(87) PCT Pub. No.: WO2014/154685
PCT Pub. Date: Oct. 2, 2014

(65) Prior Publication Data
US 2016/0054446 A1    Feb. 25, 2016

(30) Foreign Application Priority Data
Mar. 28, 2013   (DE) .......................  10 2013 205 589

(51) Int. Cl.
*G01C 3/08*     (2006.01)
*G01S 17/08*    (2006.01)
(Continued)

(52) U.S. Cl.
CPC .............. *G01S 17/08* (2013.01); *G01S 7/481* (2013.01); *G02B 7/16* (2013.01); *G02B 15/04* (2013.01);
(Continued)

(58) Field of Classification Search
CPC .......... G01S 17/08; G01S 7/481; G02B 7/16; G02B 15/04; G02B 19/0047;
(Continued)

(56) References Cited

U.S. PATENT DOCUMENTS 5,283,622 A     2/1994  Ueno et al.
2005/0219504 A1  10/2005 Adachi et al.
(Continued)

FOREIGN PATENT DOCUMENTS

CN     1677050 A    10/2005
CN     1853116 A    10/2006
(Continued)

OTHER PUBLICATIONS

PCT/EP2014/055949, International Search Report dated Jun. 11, 2014 (Three (3) pages).
(Continued)

*Primary Examiner* — Samantha K Abraham
(74) *Attorney, Agent, or Firm* — Crowell and Moring LLP

(57) ABSTRACT

A device for the optical measurement of a distance from a reflecting or scattering target object is disclosed. The device has a distance measurement device and an adjusting device arranged outside of the distance measurement device having a second transmission optical unit adjustable between a first and second position for forming the laser light into a beam, where in the first position, the second transmission optical unit is arranged in the laser beam, and in the second position, it is arranged outside of the laser beam.

9 Claims, 3 Drawing Sheets

(51) Int. Cl.
    *G01S 7/481*    (2006.01)
    *G02B 15/04*    (2006.01)
    *G02B 19/00*    (2006.01)
    *G02B 7/16*     (2006.01)
    *G02B 27/30*    (2006.01)
    *G02B 27/40*    (2006.01)
    *G02B 7/00*     (2006.01)

(52) U.S. Cl.
    CPC ..... *G02B 19/0047* (2013.01); *G02B 19/0076* (2013.01); *G02B 27/30* (2013.01); *G02B 27/40* (2013.01); *G02B 7/006* (2013.01)

(58) Field of Classification Search
    CPC .... G02B 19/0076; G02B 27/30; G02B 27/40; G02B 7/006
    See application file for complete search history.

(56) References Cited

U.S. PATENT DOCUMENTS

2007/0115454 A1* 5/2007 Schanz ............... G01S 7/481
                                                    356/4.01
2013/0135604 A1   5/2013 Gogolla et al.
2014/0151535 A1* 6/2014 Mori .................. G01S 17/42
                                                    250/214.1

FOREIGN PATENT DOCUMENTS

| CN | 102226842 A      | 10/2011 |
|----|------------------|---------|
| DE | 197 27 988 A1    | 1/1998  |
| DE | 198 40 049 A1    | 4/2000  |
| DE | 101 24 433 A1    | 11/2002 |
| DE | 20 2010 013 902 U1 | 1/2011 |
| DE | 10 2011 076 493 A1 | 11/2012 |
| EP | 0 766 101 A2     | 4/1997  |
| EP | 1 154 284 A1     | 11/2001 |
| WO | WO 2005/029124 A1 | 3/2005 |
| WO | WO 2010/020755 A2 | 2/2010 |

OTHER PUBLICATIONS

German Office Action dated Jan. 15, 2014 (Three (3) pages).
Chinese Office Action issued in Chinese counterpart application No. 201480018079.9 dated Aug. 3, 2016, with English translation (Fifteen (15) pages).

* cited by examiner

DEVICE FOR THE OPTICAL MEASUREMENT OF THE DISTANCE FROM A REFLECTING OR SCATTERING TARGET OBJECT

This application claims the priority of International Application No. PCT/EP2014/055949, filed Mar. 25, 2014, and German Patent Document No. 10 2013 205 589.7, filed Mar. 28, 2013, the disclosures of which are expressly incorporated by reference herein.

BACKGROUND AND SUMMARY OF THE INVENTION

The present invention relates to an apparatus for optically measuring a distance to a reflecting or scattering target object.

DE 197 27 988 A1 discloses a known apparatus for optical distance measurement to a target object consisting of a telescope, a distance measuring device, and an adjustment device for adjusting the laser beam divergence or the laser beam diameter. The distance measurement device comprises a beam source that emits a laser beam, a detector that receives a reception beam reflected and/or scattered at the target object, and a beam-shaping system with a transmission optical unit for shaping the laser beam, and a reception optical unit for shaping the reception beam. The laser beam divergence or the laser beam diameter may be modified by way of the exit angle of the laser beam at the beam source, a modification to the optical path length between the beam source and the transmission optics, or by additional transmission optics behind the beam source. The disadvantage is that all proposed measures for adjusting the laser beam divergence or the laser beam diameter within the distance measuring device reduce the stability of the distance measuring device.

An apparatus is known from DE 198 40 049 A1 for optically measuring the distance to a reflecting or scattering target object. The apparatus comprises a distance measuring device and an adjustment device for adjusting the laser beam to the target object. The distance measurement device comprises one or two beam sources, a detector, and a beam-shaping system with a transmission optical unit and a reception optical unit. The beam sources generate a first laser beam with a large beam divergence and a second laser beam with a low beam divergence, wherein the first laser beam is provided for the distance measurement of scattering target objects and the second laser beam is provided for the distance measurement of reflecting target objects.

The selection of a suitable laser beam may take place at the beam sources or at the detector. In one embodiment, the first and second laser beams are simultaneously emitted and strike the target object. In the beam path of the reception beam, optical filters are arranged in front of the detector that only let through the first or second laser beam. The optical filters are arranged in a manually operable or motor-driven filter wheel or filter slider, which introduce individual optical filters into the beam path of the reception beam. The disadvantage is that two laser beams with different beam divergences are required to adjust the distance measurement to the target object. To generate the different beam divergences, multiple beam paths and beam-shaping optics are required, which increase the space required.

The object of the present invention consists in developing an apparatus for the optical distance measurement for reflecting and scattering target objects, in which the number of optical components is reduced and in which the requirements placed on the production tolerances of the components is also reduced.

According to the invention, an adjustment device arranged outside the distance measurement device is provided with a second transmission optical unit, displaceable between a first and second position, for shaping the laser beam, wherein in the first position, the second transmission optical unit is arranged in the laser beam and in the second position, it is arranged outside the laser beam. The advantage of the second transmission optical unit is that the beam divergence, the beam diameter or the beam divergence and the beam diameter of the laser beam can be adjusted to the properties of the target object and/or the distance to the target object. By arranging the adjustment device outside the distance measurement device, the stability of the distance measurement device is not impaired. The emitted laser beam is collimated first by the first transmission optical unit and the collimated laser beam strikes the second transmission optical unit. Due to the fact that the collimated laser beam strikes the second transmission optical unit, the tolerance requirements imposed on the adjustment device are reduced compared to a design in which a divergent laser beam strikes the adjustment device.

Preferably, the distance measurement device has an optics carrier with a first mounting receptacle for attaching a first electro-optic component and a second mounting receptacle for attaching the first beam-shaping system. The optics carrier is constructed in a particularly preferred manner as monolithic and allows a compact structure of the distance measuring device. In a particularly preferred manner, the distance measurement device has a circuit board with a mounting receptacle for attaching a second electro-optical component and a connection device that connects the circuit board to the optics carrier.

In a preferred embodiment, the first transmission optical unit is constructed as a collimation optical unit and the second transmission optical unit is constructed as a scattering optical unit. The collimation optical unit of the distance measurement device generates a collimated laser beam that subsequently strikes the scattering optical unit of the adjustment device. The optical properties of the collimation optical unit are thereby adapted to scattering target objects and the scattering optical unit is provided for the distance measurement of reflecting target objects. The first position of the second transmission optical unit in the laser beam is provided for reflecting target objects and the second position of the second transmission optical unit outside the laser beam is provided for scattering target objects. The advantage of the collimation optical unit for measuring the distance of reflecting target objects consists of the requirements pertaining to production tolerances of the adjustment device and the precision during adjustment being reduced when a collimated laser beam, instead of a divergent laser beam, strikes the adjustment device.

In a particularly preferred manner, the adjustment device has multiple second transmission optical units for shaping the laser beam, wherein the second transmission optical units are constructed as scattering optical units with various expansion properties. In doing so, the expansion properties of the scattering optical units are adapted to various distance ranges of the reflecting target objects. To ensure that the laser beam is reflected on the target object and is detected as a reflected reception beam by the distance measurement device, a high degree of expansion of the laser beam is required at short distances to the target object. For large distances of the distance measurement device to the target object, a high degree of expansion of the laser beam would result in only a small portion of the laser beam being reflected at the target object and striking the distance measurement device as a reflected reception beam. If the intensity of the reception beam as measured by the detector is too low, the inaccuracy of the distance measuring increases. An adjustment device with various scattering optical units enables one to adjust the expansion of the laser beam to the distance range of the reflecting target objects.

An automatic selection of an appropriate scattering optical unit may occur in an iterative procedure. In a first step, a distance measurement takes place with a first scattering optical unit. The intensity of the measured distance value is compared against a specified value range. If the intensity falls below the lower value of the value range, the laser beam was excessively expanded; if the intensity exceeds the upper limit of the value range, the laser beam was not expanded sufficiently. If the measured intensity lies within the value range, the appropriate scattering optical unit is arranged in the laser beam. If the intensity lies outside the value range, a second scattering optical unit is arranged in the laser beam and another distance measurement is performed.

The distance value is again compared against the value range. It is advantageous to arrange the scattering optical units in an ascending manner (increasing beam expansion) or in a descending manner (decreasing beam expansion) in the laser beam. Fundamentally, it is also possible to freely select scattering optical units to determine the appropriate scattering optical unit in an iterative manner.

In a preferred design, the adjustment device comprises an optics wheel that is displaceable about a rotation axis. Multiple scattering optical units may be integrated into an optics wheel, which is constructed in a rotatable manner about a rotation axis, so that the expansion of the laser beam can be adjusted to the distance range of the reflecting target objects. An optics wheel has a small space requirement. The drive of the optics wheel may occur in a motor-driven manner by means of a motorized drive unit or be performed manually by the operator.

In an alternative design, the adjustment device has an optics slider that can be displaced along a translation axis. The drive of the optics slider may be executed in a motor-driven manner by means of a motorized drive unit or be performed manually by the operator.

In a preferred development, the adjustment device has a second reception optical unit, displaceable between a first and a second position, for shaping the reception beam, wherein in the first position, the second reception optical unit is arranged in the reception beam and in the second position, it is arranged outside the reception beam. The advantage of the second reception optical unit is that the properties of the adjustment device can be adjusted to the properties of the reflecting target object and/or the distance to the reflecting target object. With the help of the second reception optical unit, the reception beam reflected at the target object can be dampened to prevent one from overloading the detector.

In a particularly preferred manner, the first reception optical unit is constructed as a focusing optical unit and the second reception optical unit is constructed as a diffusing lens. The laser beam reflected at the target objects first strikes the diffusing lens. By means of the properties of the diffusing lens, the portion of the reflected laser beam that strikes the focusing optical unit can be adjusted.

In a particularly preferred manner, the adjustment device has multiple second reception optical units for shaping the reception beam, wherein the second reception optical units are constructed as diffusing lenses with various properties. The properties of the second reception optical units are thereby adapted to various distance ranges of the reflecting target objects. By means of the properties of the various diffusing lenses, the portion of the reflected reception beam striking the focusing optical unit can be adjusted.

In a preferred embodiment, the second transmission optical unit and the second reception optical unit are integrated into a common second beam-shaping optical unit. The second beam-shaping optical unit is thereby displaceable in a particularly preferred manner between a first and a second position, wherein in the first position, the second transmission optical unit is arranged in the laser beam and in the second position, it is arranged outside the laser beam, and in the first position, the second reception optical unit is arranged in the reception beam and in the second position, it is arranged outside the reception beam. Integrating the second transmission optical unit and the second reception optical unit into a common second beam-shaping optical unit simplifies the structure of the adjustment device and reduces the number of required components. The fewer the number of required components, the more compactly the distance measurement device and the adjustment device can be designed.

In a coaxial structure of the distance measurement device, the transmission and reception optical units are arranged coaxially to each other and in a para-axial structure of the distance measurement device, the transmission and reception optical units are arranged side by side.

Embodiments of the invention are described below using the drawings. It is not necessarily intended to portray the exemplary embodiments to scale; rather the drawings, where convenient for explanation purposes, are executed in a schematic and/or slightly distorted manner. In regard to supplements of the teachings readily evident from the drawings, one shall refer to the relevant prior art. One shall thereby take into account that diverse modifications and changes pertaining to the shape and detail of an embodiment may be undertaken, without deviating from the general idea of the invention. The features of the invention that are disclosed in the description, the drawings, as well as the claims may be essential individually per se as well as in any combination for the development of the invention. In addition, all combinations of at least two of the features disclosed in the description, the drawings, as well as the claims fall within the scope of the invention. The general idea of the invention is not restricted to the exact form or detail of the preferred embodiment depicted and described in the following, or to a subject matter that would be limited in comparison to the subject matter claimed in the claims. For given measurement ranges, values lying within the stated limits shall be disclosed as limit values and be usable and claimable as desired. For simplicity's sake, the same reference signs are used for identical or similar parts, or for parts with an identical or similar function.

DETAILED DESCRIPTION OF THE DRAWINGS

Figure 1:
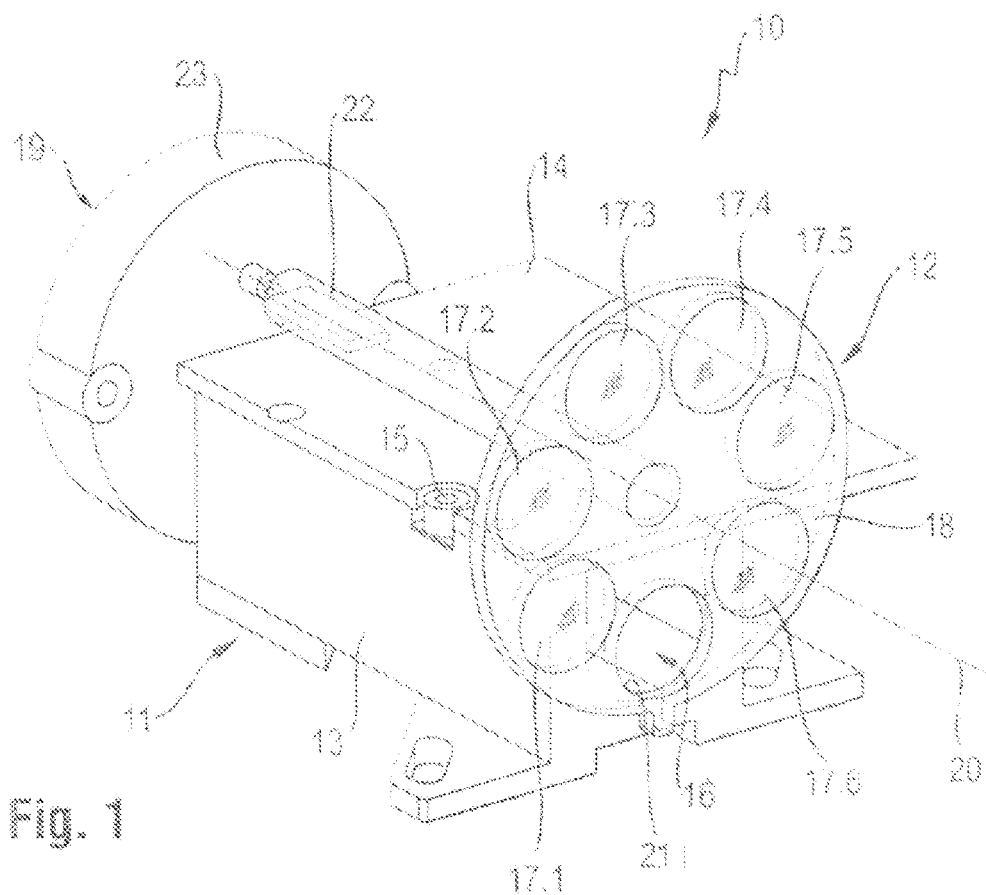
FIG. 1 is an apparatus according to the invention for the optical distance measurement to a reflecting or scattering target object consisting of a distance measuring device and an adjustment device that can be adjusted in a motor-driven manner and is arranged outside the distance measurement device.

FIG. 1 depicts a first embodiment of an apparatus 10 according to the invention for the optical distance measurement to a reflecting or scattering target object consisting of a distance measurement device 11 and an adjustment device 12 arranged outside distance measurement device 11. The distance is thereby determined from a time difference between an emitted laser beam and a reception beam reflected and/or scattered at the target object. With the help of the adjustment device 12, the laser beam and the reception beam are adjusted to the properties of the target object and if applicable to the distance range to the target object. For the target objects, one differentiates between reflecting target objects, in which the laser beam is predominantly reflected, and scattering target objects in which the laser beam is predominantly scattered.

The distance measurement device 11 comprises an optics carrier 13 and a circuit board 14 that is connected via a connection device 15 to the optics carrier 13. In the distance measurement device 11, a laser beam is generated that emerges out of measurement device 11 via a decoupling aperture 16 in optics carrier 13 and strikes the adjustment device 12. The adjustment device 12 comprises six different optical elements 17.1-17.6 that are attached in a rotatable optics wheel 18 and can be rotated by means of a motorized drive unit 19 about a rotation axis 20.

The optical elements 17.1-17.6 of the adjustment device 12 are constructed as beam-shaping optical units with a transmission optical unit for the laser beam and a reception optical unit for the reception beam. The transmission optical units and the reception optical units are thereby respectively arranged coaxially to each other and integrated into the beam-shaping optical units 17.1-17.6. The beam-shaping optical units 17.1-17.6 differ in their beam-shaping properties and are provided for the distance measurement of reflecting target objects in various distance ranges. The transmission optical units are constructed as diffusion optical units with various beam expansions of the laser beam. The smaller the distance of the reflecting target object to the distance measurement device 11, the more the laser beam must be expanded. The reception optical units are constructed as diffusing lenses. By means of the properties of the diffusing lenses, the portion of the reflecting reception beam that strikes the distance measurement device 11 is adjusted. The optics wheel 18 has, in addition to six beam-shaping optical units 17.1-17.6, an additional mounting receptacle 21 in which no beam-shaping optical units are inserted and no shaping of the laser beam and the reception beam occurs.

The optics wheel 18 is rigidly connected to an axle element 22 that can be rotated by a drive motor 23 about the rotation axis 20; the rotation angle of the drive motor 23 is detected by means of an angle sensor device. The drive of the optics wheel 18 about the rotation axis 20 can alternatively occur by means of a manual rotation device. The optics wheel 18 can be arranged in seven angle positions by a rotation about the rotation axis 20. In six angle positions, one of the beam-shaping optical units 17.1-17.6 is arranged in the laser beam, and in the seventh angle position, the beam-shaping optical units 17.1-17.6 are arranged outside the laser beam and outside the reception beam. The seventh angle position is provided for the distance measurement of diffusing target objects, whereas the angle positions, in which one of the beam-shaping optical units 17.1-17.6 is arranged in the laser beam and in the reception beam, are provided for the distance measurement of reflecting target objects.

Figure 2:
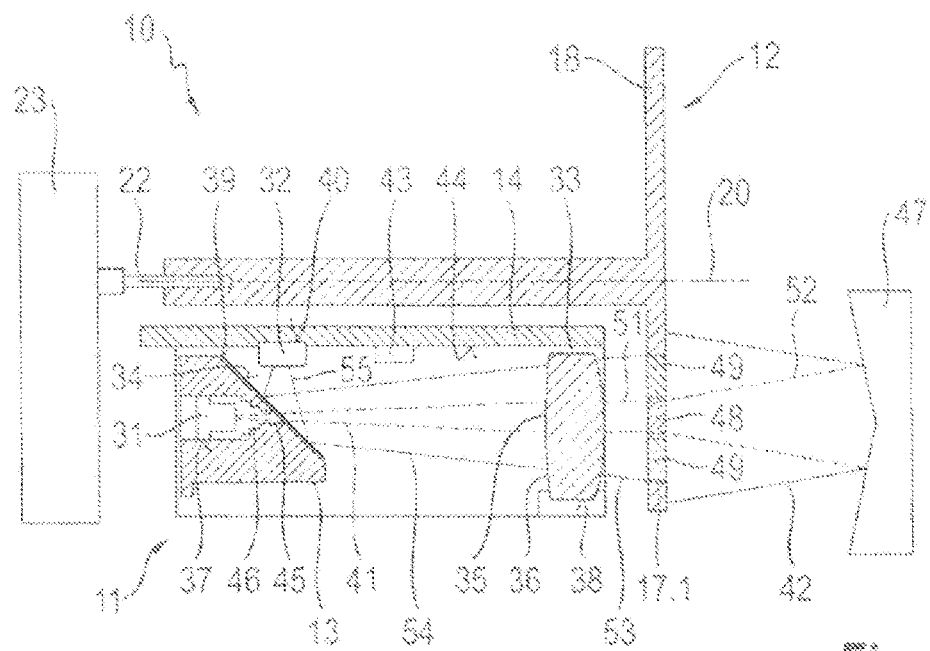
FIG. 2 illustrates the structure of the distance measuring device and the adjustment device adjustable in a motor-driven manner of FIG. 1 in detail.

FIG. 2 depicts in detail the structure of the distance measurement device 11 and the adjustment device 12, adjustable in a motor-driven manner, of apparatus 10 according to the invention for the optical distance measurement as seen in FIG. 1.

The distance measurement device 11 comprises a first electro-optical component constructed as a beam source 31, a second electro-optical component constructed as a detector 32, a beam-shaping system 33, a beam-splitting optical unit 34, the optics carrier 13, and the circuit board 14. The beam-shaping system 33 comprises transmission optical unit 35 for shaping the laser beam and a reception optical unit 36 for shaping the reception beam, which are integrated into a common beam-shaping optical unit 33. The beam source 31, the beam-shaping optical unit 33, and the beam-splitting optical unit 34 are attached to the optics carrier 13, and the detector 32 is attached to the circuit board 14. The optics carrier 13 has a first mounting receptacle 37 for the beam source 31, a second mounting receptacle 38 for the beam-shaping optical unit 33, and a third mounting receptacle 39 for the beam-splitting optical unit 34. The detector 32 is attached on the circuit board 14 in an additional mounting receptacle 40.

The beam source 31 is constructed as a laser diode that generates a visible or infrared laser beam 41. The detector 32 is constructed as a photo diode that receives a reception beam 42 reflected and/or scattered by the target object. The beam-splitting optical unit 34 separates the laser beam from the coaxially running reception beam; it is arranged in the beam path of the laser beam between the beam source 31 and the beam-shaping optical unit 33 and in the beam path of the reception beam between the beam-shaping optical unit 33 and the detector 32. A control and analysis device 43 is connected to the beam source 31 and the detector 32, and determines the distance to the target object from a time difference between a reference beam and the reception beam.

The detector 32 is arranged on a front side 44, facing the optics carrier 13, of the circuit board 14 and rigidly connected to the circuit board 14 via a solder connection, wherein the detector 32 can be automatically equipped and soldered during the production of the circuit board 14. The detector 32 is mechanically held solely by the circuit board 14; there are no connection means that connect the detector 32 directly to the optics carrier 13. The optics carrier 13 is constructed as open on a side facing the detector 32 and connected to a contact surface via the connection device 15 to the circuit board 14. The connection device 15 is constructed to be detachable while aligning the distance measurement device 11.

Arranged in the beam path of the laser beam 41 between the beam source 31 and the beam-splitting optical unit 33 is a screen 45 that is integrated into the monolithic optics carrier 13. The screen 45 serves to limit the opening angle of the beam source 31 and to adapt the geometry of the laser beam 41 to the beam-splitting optical unit 34 and the beam-shaping optical unit 33. Arranged between the beam source 31 and screen 45 is a light trap 46 that is integrated like the screen 45 into the monolithic optics carrier 13. The light trap 46 serves to absorb the incoming light and prevent undesired reflections. To do so, the light trap 46 is equipped on the interior side with a low-reflection, absorbent coating. Optical and electrical crosstalk from the beam source 31 to the detector 32 is reduced by means of the screen 45 and the light trap 46.

In apparatus 10 depicted in FIG. 2, the distance is measured to a reflecting target object 47 that is located a short distance to the distance measuring device 11. The beam-shaping optical unit 17.1 is provided for the distance measurement to reflecting target objects a short distance away and therefore arranged in the beam path of the laser beam and the reception beam. The beam-shaping optical unit 17.1 has a transmission region 48 for shaping the laser beam 41. and a reception region 49 for shaping the reception beam 42. The transmission region is referred to as the second transmission optical unit 48 and the reception region is referred to as the second reception optical unit 49. The second transmission optical unit 48 and the second reception optical unit 49 are integrated into the common beam-shaping optical unit 17.1. Analogous to the beam-shaping optical unit 17.1, the beam-shaping optical units 17.2-17.6 of the optics wheel 18 each have a transmission region 48 and a reception region 49, which are referred to as the second transmission optical unit 48 and the second reception optical unit 49.

The beam source 31 emits the laser beam 41, which is directed to the beam-splitting optical unit 34. A largest-possible portion of the laser beam 41 is transmitted to the beam-splitting optical unit 34 and it strikes the first transmission optical unit 35 at which a first beam-shaping occurs. The first transmission optical unit 35 is constructed as a collimation optical unit that collimates the laser beam 41 and directs it as a collimated laser beam 51 to the second transmission optical unit 48. The optical properties of the collimation optical unit 35 are adjusted to the distance measurement of scattering target objects. The collimated laser beam 51 strikes the second transmission optical unit 48, which is arranged in the beam path of the collimated laser beam 51 and at which an expansion of the laser beam 51 occurs. The expanded laser beam 52 strikes the target object 47 and is reflected at the target object 47.

The reception beam 42 reflected at the target object 47 strikes the second reception optical unit 49, which shapes the reception beam 42 and directs it as a simply shaped reception beam 53 to the first reception optical unit 36. At the first reception optical unit 36, additional beam-shaping of the reception beam 53 takes place. The second shaped reception beam 54 is directed to the beam-splitting optical unit 34 and redirected to the beam-splitting optical unit 34. The redirected reception beam 55 strikes the detector 32. The beam-splitting optical unit 34 ensures that the optical axis of the redirected reception beam 55 and the optical axis of the emitted laser beam 41 differ from each other.

Figure 3:
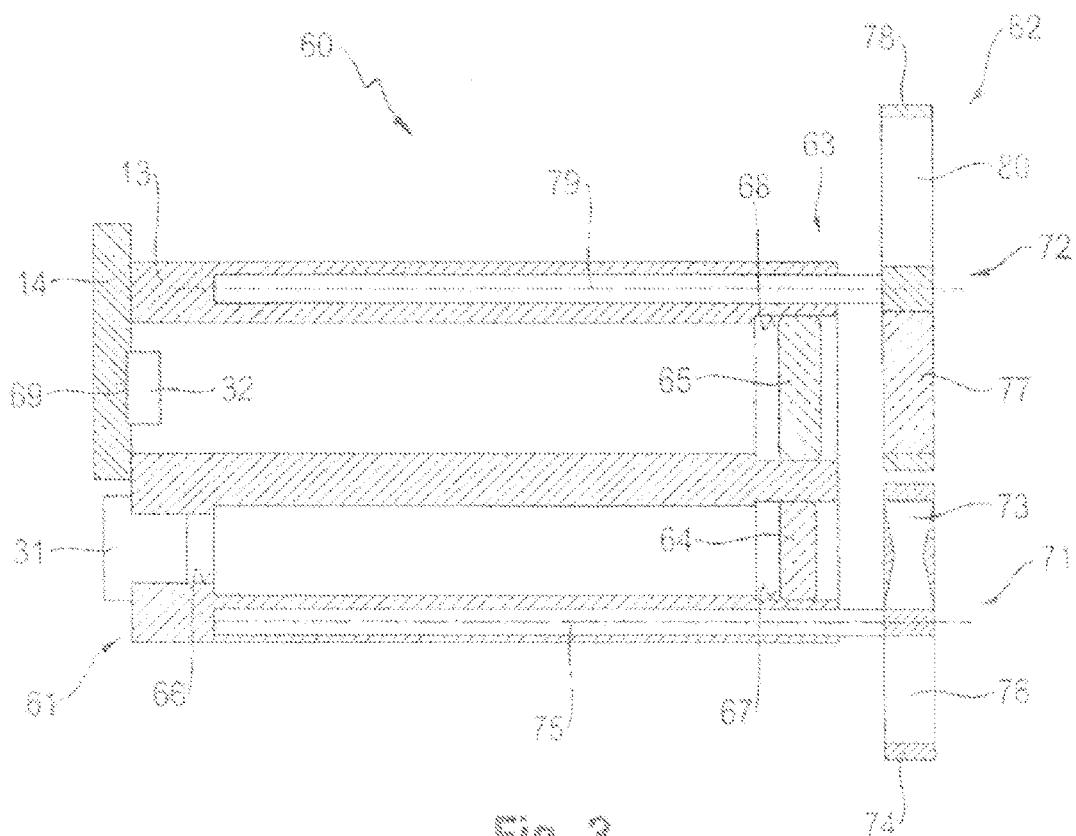
FIG. 3 is an alternative embodiment of an apparatus according to the invention for the optical distance measurement consisting of a distance measuring device and an adjustment device.

FIG. 3 depicts an alternative embodiment of an apparatus 60, according to the invention, for the optical distance measurement to a reflecting or scattering target object, consisting of a distance measurement device 61 and an adjustment device 62. The distance measurement device 61 differs from the distance measurement device 11 in that the path of the laser beam and the reception beam are arranged in a parallel offset manner.

The distance measurement device 11 has a so-called coaxial arrangement of the beam source 31 and the detector 32, and the distance measurement device 61 has a para-axial arrangement.

The distance measuring device 61 comprises, besides the beam source 31 and the detector 32, a beam-shaping system 63 with a first transmission optical unit 64 for shaping the laser beam and a first reception optical unit 65 for shaping the reception beam. The beam source 31, the first transmission optical unit 64, and the first reception optical unit 65 are attached to the optics carrier 13, and the detector 32 is attached to the circuit board 14. The monolithic optics carrier 13 has a first mounting receptacle 66 for the beam source 31, a second mounting receptacle 67 for the first transmission optical unit 64, and a third mounting receptacle 68 for the first reception optical unit 65. The detector 32 is attached to the circuit board 14 in an additional mounting receptacle 69.

The adjustment device 62 consists of a first adjustment device 71 for the laser beam and a second adjustment device 72 for the reception beam. The first adjustment device 71 comprises an optical element 73 that is attached in a first optics wheel 74 and is rotatably constructed about a first rotation axis 75. The optical element 73 is constructed as a diffusion optical unit and is referred to as the second transmission optical unit 73. The first optics wheel 74 has, besides the second transmission optical unit 73, an additional mounting receptacle 76, in which no beam-shaping optical unit is inserted; furthermore, additional second transmission optical units 73 with various beam expansions may be arranged in the first optics wheel 74. The second adjustment device 72 comprises an optical element 77 that is attached in a second optics wheel 78 and is rotatably constructed about a second rotation axis 79. The optical element 77 is constructed as a diffusing lens and is referred to as the second reception optical unit 77. The second optics wheel 78 has, besides the second reception optical unit 77, an additional mounting receptacle 80, into which no beam-shaping optical unit is inserted; furthermore, additional, second reception optical units 77 with various scattering capabilities may be arranged in the second optics wheel 78.

Figure 4:
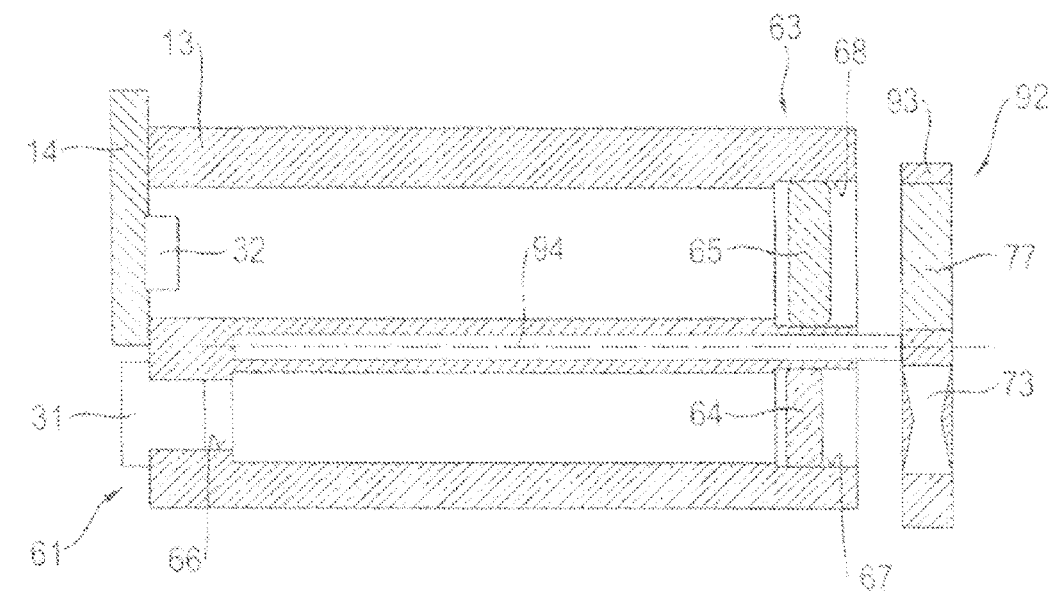
FIG. 4 is an alternative embodiment for the adjustment device of FIG. 3.

FIG. 4 depicts an alternative embodiment of an adjustment device 92 for the apparatus 60 according to the invention for optical distance measurement. The adjustment device 92 differs from the adjustment device 62 of FIG. 3 in that the second transmission optical unit 73 for shaping the laser beam and the second reception optical unit 77 for shaping the reception beam are arranged in a common optics wheel 93. The optics wheel 93 is rotatably constructed about a rotation axis 94 and also has additional mounting receptacles 76, 80 in which no beam-shaping optical units are inserted.

The optics wheel 93 can be shifted between two different angle positions. In the first angle position of the optics wheel 93 depicted in FIG. 4, the second transmission optical unit 73 is arranged in the laser beam and the second reception optical unit 77 is arranged in the reception beam. The second transmission optical unit 73 and the second reception optical unit 77 are adjusted for distance measurement of a reflecting target object. If the optics wheel 93 is rotated into the second angle position, the second transmission optical unit 73 is arranged outside the laser beam and the second reception optical unit 77 is arranged outside of the reception beam.

Figure 5:
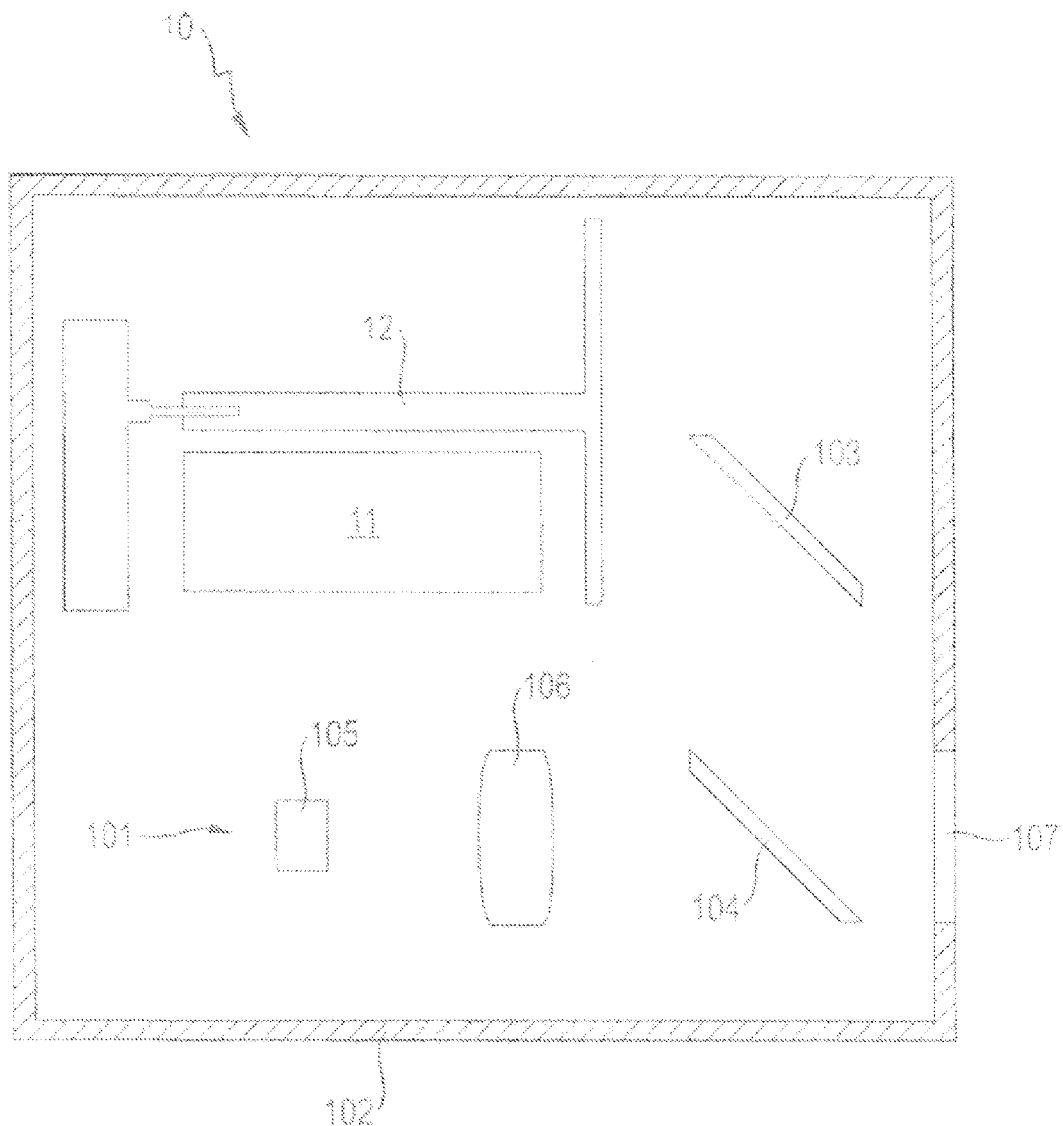
FIG. 5 illustrates the apparatus according to the invention depicted in FIG. 1 for the optical distance measurement in a measurement unit with a camera device.

FIG. 5 shows the apparatus 10 according to the invention depicted in FIG. 1. for optical distance measurement which is arranged with a camera device 101 in a device housing 102. The laser beam generated in the distance measuring device 11 strikes the adjustment device 12, which adjusts the laser beam to the target object. So that the beam path of the camera device 101 and the beam path of the laser beam are arranged coaxially to each other, a first and second partially transparent mirror 103, 104 are arranged in the device housing 102. The camera device 101 comprises a sensor device 105 and a camera optical unit 106. The laser beam exits the device housing 102 via a decoupling aperture 107 and the reception beam reflected and/or scattered at the target object enters the device housing 102 via decoupling aperture 107.

The invention claimed is:

1. An apparatus for optical measurement of a distance from a reflecting or scattering target object, comprising:
   a distance measurement device, wherein the distance measurement device includes:
      a beam source, wherein the beam source is a first electro-optical component and emits a laser beam;
      a detector, wherein the detector is a second electro-optical component and receives a reception beam reflected or scattered at the target object; and
      a first beam-shaping system with a first transmission optical unit for shaping the laser beam and a first reception optical unit for shaping the reception beam; and
   an adjustment device disposed outside of the distance measurement device with a second transmission optical unit displaceable between a first position and a second position for shaping the laser beam;
   wherein in the first position the second transmission optical unit is disposed in the laser beam;
   wherein in the second position the second transmission optical unit is disposed outside of the laser beam;
   wherein the first transmission optical unit is a collimation optical unit and wherein the second transmission optical unit is a scattering optical unit.

2. The apparatus according to claim 1, wherein the distance measurement device has an optics carrier with a first mounting receptacle for attaching the first electro-optical component and a second mounting receptacle for attaching the first beam-shaping system.

3. The apparatus according to claim 2, wherein the distance measurement device has a circuit board with a mounting receptacle for attaching the second electro-optical component and a connection device that connects the circuit board to the optics carrier.

4. The apparatus according to claim 1, wherein the adjustment device has a plurality of second transmission optical units, wherein the plurality of second transmission optical units are scattering optical units with various expansion properties.

5. The apparatus according to claim 4, wherein the adjustment device is an optics wheel that is displaceable about a rotation axis.

6. The apparatus according to claim 4, wherein the adjustment device is an optics slider that is displaceable along a translation axis.

7. The apparatus according to claim 1, wherein the adjustment device has a second reception optical unit displaceable between a first position and a second position for shaping the reception beam;
   wherein in the first position the second reception optical unit is disposed in the reception beam;
   and wherein in the second position the second reception optical unit is disposed outside of the reception beam.

8. The apparatus according to claim 7, wherein the first reception optical unit is a focusing optical unit and wherein the second reception optical unit is a diffusing lens.

9. The apparatus according to claim 8, wherein the adjustment device has a plurality of second reception optical units, wherein the plurality of second reception optical units are diffusing lenses with various properties.

* * * * *